United States Patent Office 3,275,601
Patented Sept. 27, 1966

3,275,601
MANUFACTURE OF POLYCARBONATES USING TERTIARY AMINES, QUATERNARY AMINES AND SALTS THEREOF AS CATALYSTS
Hermann Schnell, Krefeld-Urdingen, and Ludwig Bottenbruch and Heinrich Krimm, both of Krefeld-Bockum, Germany, assignors to Farbenfabriken Bayer Aktiengesellschaft, Leverkusen, Germany, a corporation of Germany
No Drawing. Original application Jan. 4, 1956, Ser. No. 557,256. Divided and this application July 28, 1965, Ser. No. 475,576
Claims priority, application Germany, Mar. 26, 1955, F 17,167
15 Claims. (Cl. 260—47)

This is a divisional application of our copending application Serial No. 557,256, filed January 4, 1956, and now abandoned, which in turn is a continuation-in-part of Serial No. 461,939, filed October 12, 1954, and now U.S. Patent No. 3,028,365.

This invention relates to a new class of thermoplastic materials having some unusual and valuable properties, and more particular it relates to film and fibre forming, pliable, strong, and elastic polycarbonates of high molecular weight, the linear molecules of which may be oriented by stretching.

Further the invention relates to the process for preparing such thermoplastic, high molecular weight, film and fibre forming polycarbonates.

Polycarbonates have the general formula:

(I)
$$[-R-O-\overset{\overset{O}{\|}}{C}-O-]_n$$

wherein R represents divalent aliphatic, cycloaliphatic, or aromatic radicals and $n$ a number greater than 1.

Such polycarbonates are well known in the art, especially such wherein R is a divalent aliphatic or a divalent mono-nucleous aromatic hydrocarbon radical. The known aliphatic polycarbonates, however, have no technical importance, in account of their low softening point, while aromatic polycarbonates in general may not be treated as they are insoluble in customary solvents and decompose at their melting temperature.

The subject of the present invention are polycarbonates of the formula:

(II)

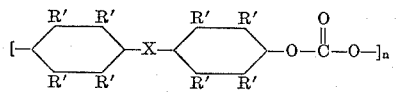

wherein X is selected from the group consisting of

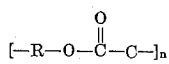

and

each R being selected from the group consisting of hydrogen, unbranched and branched monovalent aliphatic hydrocarbon residues up to 10 carbon atoms, monovalent cycloaliphatic residues, monovalent araliphatic hydrocarbon residues having up to 4 carbon atoms as side- chains, the phenyl and the furyl residue, Z represents the carbon and hydrogen atoms completing a cycloaliphatic ring, each R' represents a member of the group consisting of hydrogen, monovalent unbranched and branched aliphatic hydrocarbon residues up to 5 carbon atoms, monovalent cycloaliphatic and aromatic hydrocarbon residues, and $n$ represents a number greater than 20, especially than 50.

Preferred polycarbonates are such in which R"'s are hydrogen atoms and R's are aliphatic or cycloaliphatic hydrocarbon residues of the kind mentioned above, whereby the two R's may be the same or different members of the group mentioned above, for instance an aliphatic or cycloaliphatic hydrocarbon residue.

Examples of polycarbonates according to the invention are such of the Formula II, in which both R's and all R"'s are hydrogen atoms, further in which one R is a hydrogen atom, the other R is the methyl, the ethyl, the propyl, the isopropyl, the butyl, the isobutyl, the amyl, the hexyl, the heptyl, the octyl, the nonyl, the decyl, the 1-methyl-1-butenyl, the 1-ethyl-1-pentenyl, the cyclopentyl, the cyclohexyl, the benzyl, the 4-methyl-, ethyl-, propyl-, isopropyl-, and butyl phenylen, the phenyl, and the furyl residue, and all R"'s are hydrogen atoms, in which each R is the same or a different member of the hydrocarbon residues mentioned here above and all R"'s are hydrogen atoms, in which X is

Z representing the carbon and hydrogen atoms completing the cyclopentane or the cyclohexane ring and R' is hydrogen, and such, in which each R represents a hydrogen atom or the same or a different member of the groups mentioned above and each R' represents a member of the group consisting of the methyl, the ethyl, the propyl, the isopropyl, the n-butyl, the tert.butyl, the isobutyl, the tert.amyl, the cyclopentyl, the cyclohexyl, and the phenyl group, the remaining R"'s being hydrogen.

Under these polycarbonates typical representatives are for instance the poly-(2,2-(4,4'-dihydroxy-diphenylen)-propane-carbonate), the poly-(2,2-(4,4'-dihydroxy-diphenylen)-butane-carbonate), the poly-(2,2-(4,4'-dihydroxy-diphenylen)-pentane-carbonate, the poly-(1,1-(4,4'-dihydroxy-diphenylen)-cyclohexane-carbonate), and the mixed poly - (2,2-(4,4'-dihydroxy-diphenylen)-propane- and (4,4'-dihydroxy-diphenylen-methane-carbonate).

The polycarbonates according to the invention are distinguished by a number of remarkable properties, particularly by a relatively high softening point, especially by an extremely high second order transition point, further by remarkable resistivity against high and low temperatures and against water and chemical ingredients, particularly acids, inorganic bases, and oxidizing substances, an extremely low water absorption, and permeability for water vapor, a high solubility in numerous solvents, for instance in aromatic hydrocarbons, such as benzene, toluene, o-, m- and p-xylene, chlorinated hydrocarbons, such as methylenechloride and chloroform, in esters such as ethyl or butyl acetate, in ketones, such as acetone and cyclohexanone, in phenoles, such as phenol and o-, m- and p-cresol, and organic amines, such as pyridine, by suitable mechanical and electrical properties, such as tensile strength, elongation, elasticity, flexibility, breaking tension, impact strength, hardness according to Brinell's method, flex life, insulation resistivity, surface resistivity, puncture strength, dielectric constant, and dissipation factor. Surprisingly the mentioned electrical properties are practically stable up to relatively high temperatures, especially the dissipation factor and the di-electric constant up to about 150° C.—the sum of such properties has never been found at any other synthetic high molecular weight compound.

According to the high solubility in some solvents and according to the thermic stability up to the softening point of the new polycarbonates they can be worked up from solutions or from the melt into shaped articles such as films, fibres, moulds, and coatings etc. The latter may be prepared by pressing, spraying, flame spraying, and the like. Films and fibres can be oriented by stretching.

The strength of such stretched products is essentially increased whereas the elongation is decreased.

The new polycarbonates can also be mixed with plasticizers, such as tricresyl phosphate, fillers, such as asbestos, glass fibres and the like, or pigments and dyes.

In accordance with the process for preparing polycarbonates of the present invention, dihydroxy compounds are reacted with derivatives of the carbonic acid selected from the group consisting of carbonic acid diesters, especially diaryl esters, phosgene and bis-chloro-carbonic acid esters of dihydroxy compounds.

According to the invention the dihydroxy compounds in these processes are di(monohydroxy-arylen)-alkanes of the generic formula:

(III)

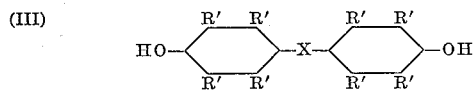

wherein X and R' represent the same atoms or groups as in Formula II. The two phenolic radicals may be the same or different.

Suitable di-(monohydroxy-arylen)-alkenes are for example:

4,4'-dihydroxy-diphenylen-methane,
1,1-(4,4'-dihydroxy-diphenylen)-ethane,
1,1-(4,4'-dihydroxy-diphenylen)propane,
1,1-(4,4'-dihydroxy-diphenylen)-butane,
1,1-(4,4'-dihydroxy-diphenylen)-2-methyl-propane,
1,1-(4,4'-dihydroxy-diphenylen)-heptane,
1,1-(4,4'-dihydroxy-diphenylen)-1-phenyl-methane,
(4,4'dihydroxy-diphenylen)-(4-methyl-phenylen)-methane,
(4,4'-dihydroxy-diphenylen)-(4-ethyl-phenylen)-methane,
(4,4'-dihydroxy-diphenylen)-(4-isopropyl-phenylen)-methane,
(4,4'-dihydroxy-diphenylen)-(4-butyl-phenylen)-methane,
(4,4'-dihydroxy-diphenylen)-benzyl-methane,
(4,4'-dihydroxy-diphenylen)-α-furyl-methane,
2,2-(4,4'-dihydroxy-diphenylen)-propane,
2,2-(4,4'-dihydroxy-diphenylen)-butane,
2,2-(4,4'-dihydroxy-diphenylen)-pentane (melting point 149–150° C.),
2,2-(4,4'-dihydroxy-diphenylen)-4-methyl-pentane,
2,2-(4,4'-dihydroxy-diphenylen)-heptane (boiling point 198–200° C. under 0.3 mm. mercury gauge),
2,2-(4,4'-dihydroxy-diphenylen)-octane,
2,2-(4,4'-dihydroxy-diphenylen)-nonane (melting point 68° C.,
1,1-(4,4'-dihydroxy-diphenylen)-1-phenyl-ethane,
(4,4'-dihydroxy-diphenylen)-1-(α-furyl)-ethane,
3,3-(4,4'-dihydroxy-diphenylen)-pentane,
4,4-(4,4'-dihydroxy-diphenylen)-heptane,
1,1-(4,4'-dihydroxy-diphenylen)-cyclopentane,
1,1-(4,4'-dihydroxy-diphenylen)-cyclohexane,
2,2-(4,4'-dihydroxy-diphenylen)-dekahydronaphthalene, (melting point 181° C.),
2,2-(4,4'-dihydroxy-3,3'-dicyclohexyl-diphenylen)propane (melting point 144–146° C.),
2,2-(4,4'-dihydroxy-3,3'-dicyclohexyl-diphenylen)-propane (melting point 144–146° C.),
2,2-(4,4'-dihydroxy-3-methyl-diphenylen)-propane (melting point 114° C.),
2,2-(4,4'-dihydroxy-3-isopropyl-diphenylen)-butane,
1,1-(4,4'-dihydroxy-3,3'-dimethyl-diphenylen)-cyclohexane,
2,2-(4,4'-dihydroxy-3,3'-dibutyl-diphenylen)-propane,
2,2-(4,4'-dihydroxy-3,3'-diphenyl-diphenylen)-propane,
2,2-(4,4'-dihydroxy-2,2'-dimethyl-diphenylen)-propane,
1,1-(4,4'-dihydroxy-3,3'-dimethyl-6,6'-dibutyl-diphenylen)-butane,
1,1-(4,4'-dihydroxy-3,3'-dimethyl-6,6'-di-tert.butyl-diphenylen)-ethane,
1,1-(4,4'-dihydroxy-3,3'-dimethyl-6,6'-di-tert.butyl-diphenylen)-propane,
1,1-(4,4'-dihydroxy-3,3'-dimethyl-6,6'-di-tert.butyl-diphenylen)-butane,
1,1-(4,4'-dihydroxy-3,3'-dimethyl-6,6'-di-tert.butyl-diphenylen)-isobutane,
1,1-(4,4'-dihydroxy-3,3'-dimethyl-6,6'-di-tert.butyl-diphenylen)-heptane,
1,1-(4,4'-dihydroxy-3,3'-dimethyl-6,6'-di-tert.butyl-diphenylen)-1-phenyl-methane,
1,1-(4,4'-dihydroxy-3,3'-dimethyl-6,6'-di-tert.butyl-diphenylen)-2-methyl-2-pentane,
1,1-(4,4'-dihydroxy-3,3'-dimethyl-6,6'-di-tert.butyl-diphenylen)-2-ethyl-2-hexane, and
1,1-(4,4'-dihydroxy-3,3'-dimethyl-6,6'-di-tert.amyl-diphenylen)-butane.

These compounds which are not critical but illustrative for the invention can be produced in known manner, for instance by condensation of one mole of an aldehyde or of a ketone with two moles of phenols. Most of the compounds mentioned above are already known, those not yet known are characterised by the boiling or melting point.

In order to obtain special properties, mixtures of various di-(monohydroxy-arylen)-alkanes can also be used, thus mixed polycarbonates are obtained.

The conversion of the aforesaid di-(monohydroxy-arylen)-alkanes into high molecular weight polycarbonates by reacting with the mentioned derivatives of the carbonic acid may be carried out at temperatures from the freezing point to the boiling point of the reaction mixture, for instance as follows:

The di-(monohydroxy-arylen)-alkanes can be re-esterified with carbonic acid diesters, e.g. with the dimethyl-, diethyl-, dipropyl-, dibutyl-, diamyl-, dioctyl-, dicyclohexyl-, and especially with the diphenyl- and di-o-, m- or p-toluyl carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m- or p-toluyl and the cyclohexyl-phenyl carbonate particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

The re-esterifying process has to be verified while excluding oxygen. We prefer to pass an inert-gas such as hydrogen, nitrogen, or carbon dioxide gas through the melt.

The re-esterification may be activated by re-esterifying catalysts, such as inorganic bases, for example caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminum oxide, lead oxide, antimonotrioxide, cerium oxide, and boron oxide, acids, such as phosphoric acid and p-toluene sulphonic acid, and salts, such as sodium benzoate, calcium acetate, and boron phosphate, and alcoholates and phenolates.

The polycarbonates can also be produced by introducing phosgene into solutions of di-(monohydroxy-arylen)-alkanes in organic bases, such as dimethylaniline, diethylaniline, trimethylamine, and pyridine, or into solutions of di-(monohydroxy-arylen)-alkanes in indifferent organic solvents, such as petrol, ligroin, cyclohexane, methylcyclohexane, benzene, toluene, xylene, chloroform, methylenechloride, carbon tetrachloride, trichloroethylene, di-chloroethane, methylacetate, and ethylacetate, with addition of an acid-binding agent as mentioned above.

A process particularly suitable for producing polycarbonates consists in introducing phosgene into the aqueous solution or suspension of alkali or alkaline earth metal salts, such as lithium, sodium, potassium, and calcium salts of the di-(monohydroxy-arylen)-alkanes, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react the di-(monohydroxy-arylen)-alkanes with about equimolecular amounts of bis-chlorocarbonic acid esters of di-(monohydroxy-arylen)-alkanes mentioned above under corresponding conditions.

The reaction of the di-(monohydroxy-arylen)-alkanes with phosgene or with the chlorocarbonic esters of the di-(monohydroxy-arylen)-alkanes may be carried out at room temperature or at lower or elevated temperatures, that is to say at temperatures from the freezing point to the boiling point of the mixture.

When using phosgene or bis-chlorocarbonic acid esters as derivatives of the carbonic acid in producing polycarbonates according to the invention catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethyl ammoniumhydroxide, triethyloctadecylammoniumchloride, trimethyl-benzylammoniumfluoride, triethylbenzyl-ammoniumchloride, dimethyldodecylammoniumchloride, dimethylbenzyphenylammoniumchloride, trimethylcyclohexylammoniumbromide, and N-methylpyridiniumchloride, in amounts from about 0.05 to about 5 percent by weight referred to the di-(monohydroxy-arylen)-alkanes. These compounds may be added to the reaction mixture before or during the reaction.

Further in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert. butyl-phenol.

By adding monofunctional compounds which are capable of reacting with phosgene or with the end groups of the polycarbonates consisting of the chlorocarbonic acid ester group and which terminate the chains, such as the phenols, for instance, the phenol, the tert.butylphenol, the cyclohexylphenol, and 2,2 - (4,4 - hydroxyphenylene-4'-methoxyphenylen)-propane further aniline and methylaniline, it is possible to regulate the molecular weight of the polycarbonates in wide limits.

The following examples are given for the purpose of illustrating the invention.

Example 1

Into a mixture of 137.6 parts by weight of 2,2-(4,4'-dihydroxy-diphenylen)-propane, 66.8 parts by weight of caustic soda, 615 parts of water, 330 parts by weight of methylenechloride, 0.12 part by weight of sodium dithionite, and 1.0 part by weight of p-tert.butylphenol, 71.5 parts by weight of phosgene are introduced with stirring at about 25° C. during 2 hours. Then 3 parts by weight of triethylbenzylammoniumchloride are added while continuing stirring the mixture at room temperature for about 2 hours. After this time the solution of the polycarbonate in the methylenechloride is highly viscous. After washing the mixture with water and evaporating the solvent a colourless, elastic plastic material is obtained. The K-value is 63.0 corresponding to an average molecular weight of 45000. The theoretical average molecular weight is 47700.

The mechanical properties of injection moulded bars are: The impact strength greater than 140 cm. kg. per cm.$^2$, the impact strength of notch: 21 cm. kg. per cm.$^2$, the flexibility: 1010 kg. per cm.$^2$, the resistance of heat according to Vicat: 157° C.; according to Martens: 104° C.; the elasticity modul: 22300 kg. per cm.$^2$, the hardness according to Brinell's method: 980, the tensil stress: 625 kg. per cm.$^2$, and the strain: 202 percent.

Characteristic data of films (unstretched, thickness 65$\mu$) are for instance: the tensile stress: 923 kg. per cm.$^2$, the elongation: 194 percent, the impact strength: 1027 cm. kg. per cm.$^2$, the flex life: 6000 (with a thickness of 40$\mu$ greater than 10,000). After heating the films in air at 140° C. for 12 weeks, the tensile stress is still 100 percent, the elongation is 30 percent, the impact strength 30 percent, and the flex life 100 percent of the original value. The films are cold resisting up to −30° C. The second order transition point measured by the refraction index is 146° C. The electric properties of such films are:

| The dielectric constant (800 Hz.) | | | | The dissipation factor tan $\delta$ (800 Hz.) | | | |
|---|---|---|---|---|---|---|---|
| 20°  | 3.11 | 150° | 3.08 | 20°  | 5×10$^{-4}$ | 150° | 14×10$^{-4}$ |
| 80°  | 3.08 | 160° | 3.14 | 80°  | 5×10$^{-4}$ | 160° | 40×10$^{-4}$ |
| 110° | 3.08 | 170° | 3.26 | 110° | 10×10$^{-4}$ | 170° | 270×10$^{-4}$ |

The break-down voltage is 2700 kv. per cm. The insulation resistance is 7×10$^{16}$Ωper cm. at 20° C., the surface resistance 1.9×10$^{14}$Ωper cm.

The water absorption after lying in water for 48 hours at room temperature is 0.3 percent. After lying in water at 90° C. for 12 weeks the mechanical properties are practically not decreased.

After lying in the following liquids for 14 days at room temperature the properties of the films are practically not decreased:

In 1 n-sulphuric acid, 1 n-hydrochloric acid, 1 n-acetic acid, 10 percent sulphuric acid, 10 percent hydrochloric acid, 10 percent nitric acid, 1 n-sodium carbonate solution, 1 n-caustic soda solution, 10 percent caustic soda solution, methanol, and white spirit.

The films may be streched at room temperature and at elevated temperatures. In a single direction for 150 percent cold streched films have a tensile stress of 1700 kg. per cm.$^2$ and an elongation of 40 percent, for 200 percent streched ones a tensile stress up to 2200 kg. per cm.$^2$ and an elongation of 20 percent.

Example 2

In a solution of 41 parts by weight of sodium hydroxide in 312 parts of water are suspended 54.15 parts by weight of 2,2-(4,4'-dihydroxy-diphenylen)-propane and 3.35 parts by weight of 1,1-(4,4'-dihydroxy-diphenylen)-cyclohexane. 22 parts by weight of a mixture of xylene isomerides and 0.3 part by weight of sodium dithionite are added to this mixture and then there are introduced 37.5 parts by weight of phosgene at 30° C. within 105 minutes with stirring and cooling. The mixture is subsequently heated to 80° C. for 1 hour. The colourless product is disintegrated, washed and dried. A white powder having a K-value of 62, measured in m-cresol at 25° C., is obtained which corresponds to a relative viscosity of 1.475. The product melts at about 205° C., thereby forming a viscous melt. The shaped articles produced from solutions or melts excel in particularly high elasticity. They can be oriented by stretching. The product is particularly suited for working up from a melt.

Example 3

To a solution of 28.65 parts by weight of 1,1-(4,4'-dihydroxy-diphenylen)-cyclohexane in 35 parts by weight of absolute pyridine are added drop by drop 88.6 parts by weight of a 12.27 percent solution of phosgene in chloroform at about 0° C. within 1½ hours with stirring. After the addition of about two thirds of the phosgene solution, the reaction mixture is diluted with 150 parts by volume of methylenechloride. The reaction mixture, after dilution with the same volume of methylene chloride, is shaken out with water and dried. After evaporation of the solvent, there remains a hard, elastic, colourless mass having a softening point of 180° C. and a K-value of 40.2, measured in m-cresol at 25° C., corresponding to a relative viscosity of 1.21.

The polycarbonate forms a highly elastic, hard and strong film which renders it particularly suitable as a raw material for lacquers.

Example 4

To a solution of 43.63 parts by weight of 2,2-(4,4'-dihydroxy-3,3'-dimethyl-diphenylen)-propane in 63 parts by volume of absolute pyridine are added drop by drop 141.55 parts by weight of a 12.26 percent solution of phosgene in chloroform with stirring and cooling at 0° C. within 75 minutes. After the addition of two thirds of the phosgene solution, the reaction mixture is diluted with 235 parts by volume of absolute methylene chloride. The viscous solution obtained is again diluted with 400 parts by volume of methylene chloride and worked up as described in Example 3. The colourless elastic plastic material obtained melts at about 135° C. The K-value is 36.4, measured in m-cresol at 25° C., corresponding to a relative viscosity of 1.154. The plastic material is particularly suitable as raw material for lacquers on account of its good film-forming capacity, elasticity and hardness.

Example 5

To a solution of 256 parts by weight of 2,2-(4,4'-dihydroxy-diphenylen)-pentane in 1640 parts by weight of a 10 percent caustic soda solution are added 500 parts by weight of benzene and at an inner temperature of about 25° C. there are introduced 130 parts by weight of phosgene with stirring over a period of 3 hours. The phosgene is practically converted at once. The stirring of the mixture is continued for 1 hour and the mixture is then slowly heated to about 50° C. and kept at this temperature for 1 hour. The aqueous layer is then separated and the polycarbonate formed is diluted with benzene. The benzene solution, being cloudy due to emulsified water, is shaken out with dilute hydrochloric acid until neutral and azeotropically dehydrated. The dehydrated solution is filtered off and evaporated. A colourless, viscous, elastic plastic material is thus obtained which dissolves in benzene, toluene, ethyl and butyl acetate, forming clear solutions.

K-value: 61.0 (measured in m-cresol).
Softening point: 200–210° C.

The polycarbonate is particularly suitable as a lacquer raw material, for thermoplastic processing and for producing films from solutions or melts.

The properties of films are the following: The tensile stress: 820 kg. per cm.$^2$; the elongation: 125 percent; the impact strength: 733 cm. kg. per cm.$^2$; the flex life: 8930 (46$\mu$); the second order transition point: 137° C.

| The dielectric constant (800 Hz.) | | The dissipation factor tan δ (800 Hz.) |
|---|---|---|
| 20° C | 2.98 | 1.9×10$^{-3}$ |
| 50° C | 2.95 | 1.9×10$^{-3}$ |
| 90° C | 2.94 | 1.9×10$^{-3}$ | the water absorption after lying in water for 48 hours at room temperature: 0.2 percent.

Example 6

Into a solution of 270 parts by weight of 2,2-(4,4'-dihydroxy-diphenylen)-4-methyl-pentane in 1640 parts by weight of a 10 percent caustic soda solution are introduced, after the addition of 200 parts by weight of benzene, 130 parts by weight of phosgene at an inside temperature of about 25° C. within 3 hours with stirring. The stirring is continued for 1 hour and the mixture is then heated to boiling for another hour. The aqueous layer, from which no further precipitate is thrown out on acidifying, is separated, the viscous paste is kneaded with water until the wash-water shows no further alkaline reaction, and the solvent is driven off in steam. A colourless, viscous, elastic plastic material is thus obtained, soluble in benzene, toluene, ethyl and butyl acetate, which is particularly suitable for thermoplastic processing, as raw material for lacquers and for the production of films.

K-value: 53.8.
Softening point: 190–200° C.

The properties of films are the following: The tensile stress: 830 kg. per cm.$^2$; the elongation: 136 percent; the impact strength: 573 cm. kg. per cm.$^2$; the flex life: 6870 (42$\mu$).

| The dielectric constant (800 Hz.) | | The dissipation factor tan δ (800 Hz.) |
|---|---|---|
| 20° C | 3.13 | 1.4×10$^{-3}$ |
| 50° C | 3.10 | 1.2×10$^{-3}$ |
| 90° C | 3.10 | 1.2×10$^{-3}$ |

The water absorption after lying in water at room temperature for 48 hours: 0.1 percent.

Example 7

Into a solution of 284 parts by weight of 4,4-(4,4'-dihydroxy-diphenylen)-heptane in 1640 parts by weight of a 10 percent solution of caustic soda there are introduced, after the addition of 500 parts by weight of toluene, 149 parts by weight of phosgene at an inner temperature of 27° C. with stirring, over a period of 3 hours. The stirring is continued for 1 hour and the mixture is then heated to 70° C. for another hour. The further processing is carried out as described in Example 6. A colourless viscous plastic material is obtained, soluble in benzene, toluene, ethyl and butyl acetate as well as in acetone, which is particularly suitable for thermoplastic processing, as a raw material for lacquers, and for the production of films.

K-value: 46.2.
Softening point: 190–200° C.

The properties of films are the following: the tensile stress: 760 kg. per cm.$^2$; the elongation: 85 percent; the impact strength: 543 cm. kg. per cm.$^2$; the flex life: 7270 (51$\mu$).

Example 8

Into a solution of 242 parts by weight of 2,2-(4,4'-dihydroxy-diphenylen)-butane in 1640 parts by weight of a 10 percent solution of caustic soda there are introduced with stirring, after the addition of 250 parts by weight of toluene, 130 parts by weight of phosgene at an inner temperature of 25° C. over a period of 2½ hours. The mixture is then heated to 40–45° C. for about 2 hours with stirring. The thinly-liquid polycarbonate formed thereby thickens until it reaches a paste-like consistency. After standing overnight at room temperature the aqueous layer is separated, the paste is kneaded with water until the wash-water shows no further alkaline reaction, and the toluene is driven off by steam. A colourless, viscous and elastic plastic material is thus obtained dissolving in benzene, toluene and ethyl acetate to a clear solution which is particularly suitable for thermoplastic processing, as raw material for lacquers and for production of films.

K-value: 63.4.

Softening point: 205–215° C.

The properties of films are the following: The tensile stress: 850 kg. per cm.$^2$; the elongation: 160 percent; the impact strength: 683 cm. kg. per cm.$^2$; the flex life: 8520 (57μ); the water absorption after lying in water for 48 hours at room temperature: 0.2 percent.

| The dielectric constant (800 Hz.) | | The dissipation factor tan δ (800 Hz.) |
|---|---|---|
| 20° C | 3.27 | 1.3×10$^{-3}$ |
| 50° C | 3.25 | 1.3×10$^{-3}$ |
| 90° C | 3.25 | 2.0×10$^{-3}$ |

*Example 9*

Into a solution of 290 parts by weight of 1,1-(4,4'-dihydroxy-diphenylen)-1-phenyl-ethane in 1640 parts by weight of a 10 percent solution of caustic soda there are introduced with stirring, after the addition of 250 parts by weight of benzene, 149 parts by weight of phosgene at an inner temperature of about 25° C. After stirring for another hour, the mixture is heated to 70° C. for 1 hour and worked up as described in Example 6. A colourless, viscous and elastic plastic material, soluble in benzene, toluene, methylenechloride and chloroform to a clear solution, is obtained which is particularly suitable for thermoplastic processing and producing films.

K-value: 52.4.

Softening point: 210–220° C.

The properties of films are the following: The tensile stress: 987 kg. per cm.$^2$; the elongation: 92 percent; the impact strength: 487 cm. kg. per cm.$^2$; the flex life: 6950 (52μ).

*Example 10*

To a solution of 11.77 parts by weight of the bis-chlorocarbonic acid ester of 2,2-(4,4'-dihydroxy-diphenylen)-propane in 120 parts by weight of absolute methylenechloride there is added drop by drop with stirring a solution of 7.60 parts by weight of 2,2-(4,4'-dihydroxydiphylen)-propane in 10.5 parts by weight of absolute pyridine and 120 parts by weight of absolute methylenechloride at 0° C. over a period of 60 minutes. After the mixture is stirred at room temperature for several hours, it is worked up as described in Example 3. After evaporation of the solvent, there remains an elastic and colourless plastic material.

K-value: 36.4 (measured in m-cresol at 25° C.).

Softening point: 220–222° C.

The properties of injection moulded articles and films are similar to those given in Example 1.

*Example 11*

Into a solution of 276 parts by weight of 4,4'-(dihydroxy-diphenylen)-phenyl-methane in 1640 parts by weight of a 10 percent solution of caustic soda there are introduced with stirring, after the addition of 250 parts by weight of benzene, 149 parts by weight of phosgene at an inner temperature of about 25° C. After stirring for one hour the mixture is heated 70° C. for another hour and then worked up as described in Example 6. A colourless, viscous, and elastic plastic material, soluble in benzene, toluene, methylenechloride, and chloroform to a clear solution is obtained which is particularly suitable for the manufacture of injection mouldings and films.

K-value: 48.5.

Softening point: 200–210° C.

The properties of films are the following: The tensile stress: 921 kg. per cm.$^2$; the elongation: 73 percent; the impact strength: 423 cm. kg. per cm.$^2$; the flex life: 4230 (58μ).

*Example 12*

In a solution of 20 parts by weight of sodium hydroxide in 250 parts of water are suspended 57 parts by weight of 2,2-(4,4'-dihydroxy-diphenylen)-propane. A clear solution is formed. After the addition of 22 parts by weight of a mixture of xylene isomerides and 0.0026 part by weight of phenol, 6 parts by weight of phosgene are introduced into the solution at 30° C. with stirring and cooling. The mixture is then simultaneously treated with 31.5 parts by weight of phosgene and 21 parts by weight of sodium hydroxide in 62 parts of water in the course of 1½ hours. The mixture is subsequently stirred at 8° C. for 1 hour, the colourless granular product obtained is filtered off with suction and washed until neutral. The colourless product obtained melts at 225–227° C. into a highly viscous state. The K-value is 77, corresponding to a relative viscosity of 1,775, measured in m-cresol at 25° C. The product dissolves in solvents such as methylenechloride, chloroform, dimethylformamide, and pyridine, forming highly viscous solutions. It can be worked up into shaped articles, such as films, fibres, injection mouldings, compression mouldings, from a solution or melt, and also in conjunction with plasticizers, such as tricresyl-phosphate, and fillers, such as glass fibres, asbestos, and the like. The shaped articles, as, for example, films and fibres produced from a melt or solution can be oriented by stretching.

The properties of injection moulded articles and films are similar to those given in Example 1.

*Example 13*

Into a mixture of 358 parts by weight of 2,2-(4,4'-dihydroxy-diphenylen)-nonane, containing 46 parts by weight of a 45 percent solution of caustic soda, 1700 parts of water, and 500 parts by weight of benzene, 149 parts by weight of phosgene are introduced with stirring at 25° C. Then 4 parts by weight of the sodium salt of the isopropyl-naphthalene sulphonic acid and 0.5 part by weight of triethylamine are added. The mixture is stirred at room temperature until the solution of the polycarbonate is highly viscous. The viscous layer is kneaded with water to a neutral and saltless mass, and after evaporatiing the solvent in a vacuum drying room a colourless, viscous, and elastic polycarbonate is obtained, soluble in methylenechloride, benzene, toluene, acetic ether and butylacetate with the K-value 72 and a softening point of 170–180° C. It is particularly suitable for thermoplastic treating, as raw material for lacquers, and for the production of films from solutions.

The properties of films are the following: The tensile stress: 686 kg. per cm.$^2$; the elongation: 122 percent; the impact strength: 637 cm. kg. per cm.$^2$; the flex life: 9210 (38μ).

*Example 14*

Into a mixture of 130.7 parts by weight of 2,2-(4,4'-dihydroxy-diphenylen)-propane, 6.0 parts by weight of 4,4'-(dihydroxy-diphenylen)-methane, 66.8 parts by weight of caustic soda, 615 parts of water, 330 parts by weight of methylenechloride, and 0.12 part by weight of sodium dithionate, 71.5 parts by weight of phosgene are introduced with stirring at about 25° C. during 2 hours. Then 3 parts by weight of triethylbenzylammoniumchloride are added while continuing stirring the mixture at room temperature for about 12 hours. After this time the solution of the polycarbonate in the methylenechloride is highly viscous. The aqueous layer is separated and the solution of the polycarbonate is washed with water. After evaporating the solvent there remains a colourless, clear, tough, plastic material of the K-value of 72.2 and a softening point of 220–223° C. Films produced from a solution of the polycarbonate in methylenechloride have especially good physical properties.

Example 15

Into a mixture of 161.5 parts by weight of 1,1-(4,4'-dihydroxy-diphenylen)-cyclohexane, 66.8 parts by weight of caustic soda, 615 parts of water, 330 parts by weight of methylenechloride, and 0.12 part by weight of sodium dithionite, 71.5 parts by weight of phosgene are introduced with stirring at about 25° C. during 2 hours. Then 3 parts by weight of triethylbenzylammoniumchloride are added while continuing stirring the mixture at room temperature for about 12 hours. After this time the solution of the polycarbonate in the methylenechloride is high viscous. The aqueous layer is separated and the organic solution is washed with water. After evaporating the solvent there remains a colourless, clear, tough, plastic material of the K-value of 42.6 and of the softening point of 180° C.

Films produced from a solution of this polycarbonate in methylenechloride have high mechanical strength and a very high flexibility.

Example 16

Into a mixture of 129.2 parts by weight of 1,1-(4,4'-dihydroxy-diphenylen)-ethane, 615 parts of water, 330 parts by weight of methylenechloride, and 153.5 parts by weight of a 45 percent solution of caustic soda, 71.5 parts by weight of phosgene are introduced with stirring at 25° C. during 2 hours. While continuing stirring the mixture 2 parts by weight of the sodium salt of the isopropylnaphthalene sulphonic acid, and 0.24 part by weight of triethylamine are added. After 1¾ hours the solution of the polycarbonate in the methylenechloride is highly viscous. It is washed with water free from electrolytes. The polycarbonate is soluble for instance in methylenechloride, chloroform, 1,2-dichlorethane, cresol, cyclohexanone, dioxane, dimethylformamide, and pyridine. From a solution in methylenechloride clear films are obtained, the tensile stress of which (55μ thick) is 840 kg. per cm.$^2$, the elongation 184 percent, and the impact strength 1292 cm. kg. per cm.$^2$. The flex life is greater than 10,000.

Example 17

Into a mixture of 73 parts by weight of 1,1-(4,4'-dihydroxy-diphenylen)-butane, 0.5 part by weight of p-tert.butylphenol, 165 parts by weight of methylenechloride, 310 parts of water, and 77 parts by weight of 45 percent caustic soda solution, 35.8 parts by weight of phosgene are introduced with stirring at 25° C. during 2 hours. While continuing stirring the mixture 1 part by weight of the sodium salt of the isopropyl-naphthalene sulphonic acid, and 0.12 part by weight of triethylamine are added. After about 120 minutes the solution of the polycarbonate in the methylenechloride is highly viscous. It is washed with water free from electrolytes. The polycarbonate is soluble in methylenchloride, chloroform, dichlorethane, cresol, dioxane, acetone, cyclohexanone, butylacetate, benzol, toluene, dimethylformamide, and pyridine.

Films of this material with the K-value of 78 and a thickness of 42μ have a tensile stress of 900 kg. per cm.$^2$, an elongation of 190 percent, an impact strength of 582 cm. kg. per cm.$^2$, and a flex life greater than 10,000.

Example 18

Into a mixture of 73 parts by weight of 1,1-(4,4'-dihydroxy-diphenylen)-isobutane, 165 parts by weight of methylenechloride, 300 parts of water, 77 parts by weight of 45 percent caustic soda solution, 35.8 parts by weight of phosgene are introduced under stirring at 25° C. during 2 hours. While continuing stirring the mixture at room temperature 1 part by weight of the sodium salt of the isopropyl-naphthalene sulphonic acid, and 0.12 part by weight of triethylamine are added. After 1¼ hours the solution of the polycarbonate in the methylenechloride is highly viscous. It is washed with water free from electrolytes. The polycarbonate is soluble in methylenechloride, chloroform, dichloroethane, trichloroethylene, toluene, benzene, cresol, dioxane, acetone, cyclohexanone, dimethylformamide, and pyridine. Films of this material with the K-value of 76 and a thickness of 68μ have a tensile stress of 973 kg. per. cm.$^2$, an elongation of 240 percent, an impact strength of 727 cm. kg. per cm.$^2$, and a flex life greater than 10,000.

Example 19

A mixture of 45.6 parts by weight of 2,2-(4,4'-dihydroxy-diphenylen)-propane, 51.4 parts by weight of diphenyl carbonate, 0.02 part by weight of zinc oxide, and 0.02 part by weight of lead oxide is melted in an atmosphere of nitrogen. At an inner temperature of about 180° C. esterification begins while phenol splits off, the bulk of which distils at this temperature and at a pressure of 50 mm. mercury gauge within half an hour. After further half an hour the temperature is raised to 200° C. and the pressure reduced to 15 mm. mercury gauge and half an hour later to 1.0 mm. mercury gauge. After heating for another half an hour at 220° C., for two hours at 250° C., and for 1 hour at 270° C. the polycondensation is completed. A sticky viscous melt is obtained which solidifies to a clear, transparent, hard, tough, elastic mass. The mass can be worked up into stretchable fibres and films from solutions or from the melt or can be used to produce moulded or extruded articles.

The properties of injection moulded articles and films are similar to those given in Example 1.

Example 20

A mixture of 45.6 parts by weight of 2,2-(4,4'-dihydroxy-diphenylen)-propane, 45.0 parts by weight of diphenyl carbonate, and 0.003 part by weight (=0.006 percent) of the sodium salt of the 2,2-(4,4'-dihydroxy-diphenylen)-propane is melted in a nitrogen atmosphere. The bulk of the phenol is distilled off within ½ hour at 120–180° C. and a pressure of 20 mm. mercury gauge. Then the pressure is reduced to 0.2 mm. mercury gauge and the polycondensation completed by heating to 280° C.

The so obtained product has the same properties as that described in Example 1.

Example 21

A mixture of 45.6 parts by weight of 2,2-(4,4'-dihydroxy-diphenylen)-propane, 47.1 parts by weight of diphenyl carbonate, and 0.008 part by weight of lithiumhydride is melted under stirring in a nitrogen atmosphere. The phenol split off is distilled at 180–210° C. under a pressure of 20 mm. mercury gauge. The pressure is then reduced to 0.2 mm. mercury gauge, and the temperature raised for one hour to 250° C. and for further 2 hour to 280° C. The obtained plastic material is suitable for the production of shaped bodies, strings and films from the melt or from solutions.

The properties of injection moulded articles and films are similar to those given in Example 1.

Example 22

Into a mixture of 73 parts by weight of 1,1-(4,4'-dihydroxy-3,3'-dimethyl-diphenylen)-ethane, 165 parts by weight of methylenechloride, 310 parts of water and 77 parts by weight of a 45 percent caustic soda solution, 35.8 parts by weight of phosgene are introduced under stirring at 25° C. during 2 hours. Then 0.12 part by weight of triethylamine and 1 part by weight of the sodium salt of the isopropyl-naphthalene sulphonic acid are added to the mixture. After stirring this mixture for about 2 hours a highly viscous solution of a polycarbonate in the methylenechloride is obtained. The reaction mixture is then worked up as described in Example 17. The reaction product has properties similar to those of the polycarbonate, which is obtained from 1,1-(4,4'-dihydroxy-diphenylen)-cyclohexane.

Example 23

Under the conditions according to Example 10 a mixture of 19.65 parts by weight of 1,1-(4,4'-dihydroxy-diphenylen)-cyclohexane-bis-chlorocarbonic acid ester and 12.86 parts by weight of 1,1-(4,4'-dihydroxy-diphenylen)-cyclohexane in 350 parts by weight of methylenechloride is reacted with a solution of 11.85 parts by weight of pyridine in 55 parts by weight of methylenechloride. The mixture is worked up as described in Example 10. A polycarbonate is obtained the properties of which are similar to those of the product described in Example 15.

Example 24

Under the conditions according to Example 10 a mixture of 19.65 parts by weight of 1,1-(4,4'-dihydroxy-diphenylen)-cyclohexane-bis-chlorocarbonic acid ester and 10.27 parts by weight of 1,1-(4,4'-dihydroxy-diphenylen)-ethane in 270 parts by weight of methylenechloride are reacted with a solution of 11.85 parts by weight of pyridine in 55 parts by weight of methylenechloride. The mixture is worked up as described in Example 10. A colourless transparent product is obtained the properties of which are similar to those of the polycarbonate described in Example 15.

Example 25

Into a mixture of 118 parts by weight of 2,2-(4,4'-dihydroxy-3,3'-dicyclohexyl-diphenylen) - propane. 165 parts by weight of methylenechloride, 310 parts of water and 77 parts by weight of a 45 percent caustic soda solution, 35.8 parts by weight of phosgene are introduced under stirring during 2 hours at 25° C. Then 0.12 part by weight of triethylamine and 1 part by weight of the sodium salt of the isopropyl-naphthalene sulphonic acid are added. After stirring for about 3 hours the solution of the polycarbonate in the methylenechloride becomes viscous. The solution is worked up as described in Example 17. The product has properties similar to those of the polycarbonate produced from 2,2-(4,4'-dihydroxy-3,3'-dimethyl-diphenylen)-propane according to Example 4.

Example 26

Into a mixture of 242 parts by weight of 2,2-(4,4'-dihydroxy - 3 - methyl - diphenylen) - propane, 1640 parts by weight of a 10 percent caustic soda solution and 750 parts by weight of methylenechloride, 149 parts by weight of phosgene are introduced under stirring during 2 hours at 20° C. Then 14 parts by weight of triethylamine and 4 parts by weight of the sodium salt of the isopropyl-naphthalene sulphonic acid are added. The mixture is heated to about 35° C. After stirring the mixture for another hour a highly viscous solution is obtained. This solution is worked up as described in Example 13. A colourless, tough, and elastic polycarbonate soluble in methylenechloride, chloroform, acetic acid ester, benzene and toluene, is obtained suitable for the production of films and coatings from the melt or from solutions. The K-value is 62, the softening point is 210–230° C.

What we claim is:

1. In the process for the manufacture of polycarbonates by reacting an organic dihydroxy compound which is a di(monohydroxy-monocyclic aryl) aliphatic hydrocarbon in which each said monohydroxy-monocyclic aryl substituent is attached to the same carbon atom of said aliphatic hydrocarbon moiety with a carbonic acid derivative selected from the group consisting of phosgene and chlorocarbonic acid esters of said organic dihydroxy compounds in aqueous alkaline solution, the improvement comprising increasing the speed of the reaction by employing as a catalyst in said reaction from about 0.05 to about 5% by weight, based on the weight of said dihydroxy compound, of a member selected from the group consisting of tertiary amines, quaternary amines and salts thereof at temperatures from about 0° C. to about 100° C.

2. The process improvement of claim 1, wherein the reaction takes place in the presence of an inert organic solvent for the carbonic acid derivative and the polycarbonate.

3. The process improvement of claim 2, wherein said inert organic solvent is selected from the group consisting of petrol, ligroin, cyclohexane, methyl-cyclohexane, benzene, toluene, xylene, chloroform, methylene chloride, carbon tetrachloride, trichloroethylene, dichloroethane, methyl acetate and ethyl acetate.

4. The process improvement of claim 3, wherein the solvent is methylene chloride.

5. The process improvement of claim 3, wherein the solvent is benzene.

6. The process improvement of claim 1, wherein the reaction is carried out in the presence of a surface active agent.

7. The process improvement of claim 6, wherein said surface active agent is selected from the group consisting of alkali metal salts of higher fatty acids, alkali metal salts of sulphonic acids of higher aliphatic and aromatic hydrocarbons, polyoxethylated alcohols and phenols.

8. The process improvement of claim 7, wherein the surface active agent is the sodium salt of isopropyl-naphthalene sulphonic acid.

9. The process improvement of claim 1, wherein said quaternary amine compound is selected from the group consisting of tetramethylammoniumhydroxide, triethyl-octadecyl-ammoniumchloride, dimethyldodecyl-ammoniumchloride, trimethylcyclohexyl-ammoniumbromide, trimethyl-benzylammoniumfluoride, triethylbenzyl-ammoniumchloride, dimethylbenzylphenyl - ammoniumchloride and N-methylpyridinumchloride.

10. The process improvement of claim 9, wherein triethylbenzyl-ammoniumchloride is used.

11. The process improvement of claim 1 wherein said tertiary amine is selected from the group consisting of trimethylamine, triethylamine, dimethylaniline, diethylaniline, dimethylcyclohexylamine and pyridine.

12. The process improvement of claim 11, wherein said tertiary amine is triethylamine.

13. The process improvement of claim 1, wherein the reaction takes place in the presence of a reducing agent.

14. The process improvement of claim 13, wherein said reducing agent is selected from the group consisting of sodium and potassium sulphide, sulphite, dithionite, free phenol and p-tert.butyl-phenol.

15. The process improvement of claim 1 wherein said organic dihydroxy compound is of the formula

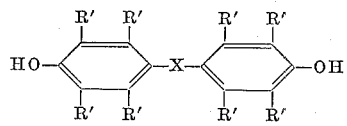

wherein X is selected from the group consisting of

and

each R being selected from the group consisting of hydrogen, unbranched and branched monovalent alkyl radicals having up to 10 carbon atoms, monovalent saturated cycloaliphatic radicals, monovalent aralkyl radicals having up to 4 carbon atoms as side-chains, phenyl, and furyl radicals, Z represents the carbon and hydrogen atoms completing a saturated cycloaliphatic ring, and each R' represents a member of the group consisting of hydrogen, monovalent unbranched and branched alkyl radicals having up to 5 carbon atoms, monovalent saturated cycloaliphatic radicals and aromatic hydrocarbon radicals.

References Cited by the Examiner

UNITED STATES PATENTS

| | | | |
|---|---|---|---|
| 3,028,365 | 4/1962 | Schnell et al. | 260—47 |
| 3,136,741 | 6/1964 | Schnell et al. | 260—47 |

SAMUEL H. BLECH, *Primary Examiner.*